United States Patent [19]
Prest, Jr
[11] 4,117,072
[45] Sep. 26, 1978

[54] PROCESS FOR ENHANCEMENT OF MECHANICAL PROPERTIES OF PHOTOCONDUCTIVE POLYMERS

[75] Inventor: William M. Prest, Jr, Webster, N.Y.
[73] Assignee: Xerox Corporation, Stamford, Conn.

[21] Appl. No.: 515,128
[22] Filed: Oct. 16, 1974
[51] Int. Cl.[2] .............................................. B29D 7/24
[52] U.S. Cl. .................................. 264/288; 96/1.5 R; 264/289; 264/DIG. 73
[58] Field of Search .............. 96/1.5 C; 264/288, 289, 264/DIG. 73, 290 R

[56] References Cited

U.S. PATENT DOCUMENTS

| | | | |
|---|---|---|---|
| 2,215,573 | 9/1940 | Beck et al. | 264/116 |
| 3,113,022 | 12/1963 | Cassiert et al. | 96/1.5 C |
| 3,231,557 | 1/1966 | Bauer | 264/288 |
| 3,243,845 | 4/1966 | Cassel | 264/288 |
| 3,307,940 | 3/1967 | Hoegl et al. | 96/1.5 C |
| 3,370,111 | 2/1968 | Boone | 264/289 |
| 3,461,199 | 8/1969 | Campbell | 264/289 |
| 3,485,624 | 12/1969 | Thiebaut et al. | 96/1.5 C |
| 3,637,433 | 1/1972 | Sims | 96/1.5 C |
| 3,816,584 | 6/1974 | Schmidt | 264/288 |

OTHER PUBLICATIONS

Encyclopedia of Polymer Science and Technology, Marks et al., vol. 2, pp. 339–345, 1965.

*Primary Examiner*—James B. Lowe

[57] ABSTRACT

Process for enhancement in the mechanical properties of polymeric films prepared from photoconductive polymers, such as poly(N-vinylcarbazole), its homologues and/or its analogues. In this process, polymeric films of these materials are subjected to strain-induced orientation whereby the polymeric chains contained therein are aligned parallel to the lines of force imparted to the film. In order to prevent accompanying deterioration of the charge carrier transport properties of the polymer during such orientation process, the film is subjected to a disordering strain either concurrent with or subsequent to such orientation in order to relax the spatial constraints on their bulky, pendant photoactive groups, and thus relieve them of the distortion imparted during such orientation. Films prepared according to this process have improved flexibility and reduced brittleness, thus making such materials highly suitable for use in flexible electrophotographic imaging members.

23 Claims, No Drawings

PROCESS FOR ENHANCEMENT OF MECHANICAL PROPERTIES OF PHOTOCONDUCTIVE POLYMERS

BACKGROUND OF THE INVENTION

1. Field of the Invention

This invention relates to a process and products of this process. More specifically, this invention involves a process for enhancement in the mechanical properties of films prepared from photoconductive polymers, such as poly(N-vinylcarbazole), its homologues and/or its analogues. The films prepared according to this process have enhanced mechanical properties and yet retain substantially the same electrical characteristics of non-oriented films.

2. Description of the Prior Art

The formation and development of images on the imaging surfaces of photoconductive materials by electrostatic means is well known. The best known of the commercial process, more commonly known as xerography, involves forming a latent electrostatic image on the imaging surface of an imaging member by first uniformly electrostatically charging the surface of the imaging layer of said member in the dark and then exposing this electrostatically charged surface to a light and shadow image. The light struck areas of the imaging layer are thus rendered relatively conductive and the electrostatic charge selectively dissipated in these irradiated areas. After the photoconductor is exposed, the latent electrostatic image on this image bearing surface is rendered visible by development with a finely divided colored electroscopic material, known in the art as "toner". This toner will be principally attracted to those areas on the image bearing surface which have a polarity of charge opposite to the charge on the toner particle and thus form a visible powder image.

The developed image can then be read or permanently affixed to the photoconductor where the imaging layer is not to be reused. This latter practice is usually followed with respect to the binder-type photoconductive films (e.g. zinc oxide/insulating resin binder) where the photoconductive imaging layer is also an integral part of the finished copy, U.S. Pat. Nos. 3,121,006 and 3,121,007.

In so called "plain paper" copying systems, the latent image can be developed on the imaging surface of a reusable photoconductor or transferred to another surface, such as a sheet of paper, and thereafter developed. When the latent image is developed on the imaging surface of a reusable photoconductor, it is subsequently transferred to another substrate and then permanently affixed thereto. Any one of a variety of well known techniques can be used to permanently affix the toner image to the copy sheet, including overcoating with transparent films, and solvent or thermal fusion of the toner particles to the supportive substrate.

In the above "plain paper" copying systems, the materials used in the photoconductive insulating layer should be preferably capable of rapid switching from insulating to conductive to insulating state in order to permit cyclic use of the imaging surface. The failure of a material to return in its relatively insulating state prior to the succeeding charging/imaging sequence will result in a decrease in the maximum charge acceptance of the photoconductor. This phenomenon, commonly referred to in the art as "fatigue" has in the past been avoided by the selection of photoconductive materials possessing rapid switching capacity. Typical of the materials suitable for use in such a rapidly cycling imaging system include anthacene, sulfur, selenium, and mixtures thereof (U.S. Pat. No. 2,297,691); selenium being preferred because of its superior photosensitivity.

In addition to anthracene (and its polymers), other organic photoconductive materials, most notably, poly(N-vinylcarbazole) have been the focus of increasing interest in electrophotography, U.S. Pat. No. 3,037,861. Until recently, neither of these polymeric materials have received serious considerations as an alternative to such inorganic photoconductors as selenium, due to fabrication difficulties and/or to a relative lack of speed and photosensitivity. The recent discovery that high loading of 2,4,7-trinitro-9-fluorenone in poly(vinylcarbazole) dramatically improves the photoresponsiveness of these polymers has lead to a resurgence and interest in organic photoconductive materials, U.S. Pat. No. 3,484,237. Unfortunately, films prepared from poly(-vinylcarbazoles) have poor mechanical properties, e.g. brittle and inflexible. The addition of high loadings of activators, such as those described in the U.S. Pat. No. 3,484,237 further impairs the mechanical properties of such films.

The orientation of vinylcarbazole polymers is generally known to improve the mechanical properties of these polymers, U.S. Pat. No. 2,215,573. However, where a film of poly(N-vinylcarbazole) is mechanically oriented, the charge transport properties of the resultant film are somewhat impaired. It is believed that during, for example, uniaxial orientation, pendant carbazyl groups are spatially constrained within the composition. It is hypothesized that modification in the steric relationship is carbazyl groups, relative to the plane of the film, is responsible for the observed deterioration in charge carrier transport properties.

While the extent and type of spacial constraint on the pendant groups of photoconductive polymers (which is occasioned during mechanical orientation of films prepared therefrom) has yet to be reported, the technical literature does contain reference to such effects in non-photoconductive polymer systems, see for example M. F. Milagin et al, "Study of Molecular Orientation in Amorphous Polystyrene By Birefringence Methods and By Infrared Spectroscopy", Polymer Science, U.S.S.R. A 12,577-584 (1970). According to the authors of this article, during the uniaxial orientation of polystyrene, the birefringence of the film changes dramatically. This change in birefringence is reportedly attributable to the change in spatial orientation of the pendant phenyl groups relative to the polymer backbone. As the polymer chains are increasingly stretched, the plane of the phenyl groups become increasingly oriented in the direction of the plane of orientation of the polymer film.

It would, thus, appear from the technical literature that the mechanical orientation of films prepared from photoconductive polymers is also impossible without substantial realignment of the pendant photoactive groups relative to the backbone of the polymer chain.

Accordingly, it is the object of this invention to remedy the above as well as related deficiencies in the prior art.

More specifically, it is the principal object of this invention to provide a process whereby the polymer's mechanical properties are enhanced without an accompanying deterioration of electrical properties.

It is another object of this invention to provide a process for enhancing the flexibility of photoconductive polymers.

It is another of the objects of this invention to provide a process for reducing the brittleness of photoconductive polymers.

It is yet another object of this invention to provide a mechanically oriented photoconductive film having good electronic properties.

SUMMARY OF THE INVENTION

The above and related objects are achieved by providing a process for enhancing the mechanical properties of films prepared from photoconductive polymers, such as poly(N-vinylcarbazole), its homologues, and/or its analogues. In this process, polymeric films of these materials are subjected to strain-induced orientation whereby the polymeric chains contained in these films are oriented along the lines of force imparted to the film. In order to prevent accompanying deterioration of the charge carrier transport properties of the photoconductive polymer during such orientation process, the film is subjected to a disordering strain either concurrent with or subsequent to such prior orientation in order to relax the spatial constraints on these bulky, pendant photoactive groups, and thus relieve them of the distortion imparted during such orientation. The temperature prevailing during such orientation process should preferably be about 10°–30C° in excess of the softening point of the polymeric film.

DESCRIPTION OF THE INVENTION INCLUDING PREFERRED EMBODIMENTS

According to the first step of the process of this invention, a relatively brittle film of a photoconductive polymeric material is heated to or slightly above its softening point temperature and subjected to substantial mechanical elongation along at least one of the major axis of the film, whereby the polymeric chains making up said film are at least partially realigned parallel to the plane of such elongation. The extent of such elongation along this major axis must be sufficient to cause at least some enhancement of tensile strength and flexibility in the stretched film. Of course, the degree of elongation is limited by the initial film thickness. Where such oriented films are to be ultimately associated with one or more additional layers in the fabrication of an electrophotographic imaging member, the final thickness of the oriented film can range from about 5 to about 100 μm. In a typical embodiment of the process of this invention, a film of poly(N-vinylcarbazole) having a thickness on the order of about 2 to about 10 mils is heated to a temperature in the range of from about 220° to about 250° C (approximately 10° to 30C° above the softening point temperature of the polymermolecular weight greater than $5 \times 10^4$), and thereafter mechanically stretched, resulting in an increase in length along at least one of its major axes on the order from about 50 to about 500%, depending upon the degree of orientation and ultimate film thickness desired. The techniques and apparatus useful in such orientation procedures are standard and fully described in both the patent and technical literature, see for example Encyclopedia of Polymer Science and Technology, Vol. 2 pp. 239–369 and Vol. 9 pp. 624–649, J. Wiley and Sons (1965).

As indicated previously, during such strain-induced orientation of a polymeric film comprising a vinyl polymer having pendant carbazyl groups, the pendant carbazyl groups are spatially constrained resulting in impairment of charged carrier transport properties of the film; the degree of such impairment depending upon the extent of orientation of the film. In order to relieve the spatial contraints on these pendant carbazyl functional groups and "flip" them back to their relatively unconstrained equilibrium molecular conformation, the oriented film is subjected to a disordering strain, preferably normal to the plane of the film. The extent of such disordering strain need only be sufficient to relieve the spatial constraints on these pendant carbazyl groups and need not cause any appreciable realignment of the polymer chains within the film. This disordering strain can be imparted to the film either concurrent with, or subsequent to such prior orientation. Where such disordering strain is imparted concurrent with orientation, such strain is staggered rather than continuous. In a typical embodiment of this invention, this disordering strain may be imparted normal to the plane of the film by contacting the film with a plate or roller which exhibits slight adherence to the elongated film. Upon contacting and subsequent separation of the plate or roller and the film, a slight elongation of the film will occur in the direction of such separation. In another embodiment of this invention, the disordering strain can be in the plane of the film and normal to the direction of principal strain, thus, producing an unbalanced biaxially oriented film.

The orientation processes described above are not restricted to homopolymer films, but can be applied with equal success to copolymer films and films containing additives. Representative of additives which can be incorporated within such films prior to orientation include those materials which are themselves photoresponsive (e.g. anthracene, phthalocyanine, or selenium pigments) or materials which are capable of sensitizing the oriented polymeric material by extending its range of spectral response (e.g. dyestuff sensitizers) or materials which are capable of enhancing its photoresponsiveness through the formation of charge transfer complexes with the oriented polymer (e.g. 2,4,7-trinitro-9-fluorenone). After having prepared an oriented polymer film (with or without inclusion of the above additives), the resulting film can be operatively associated with one or more additional layers in the fabrication of an electrophotographic imaging member. In the event that such oriented films are not capable by themselves of substantial spectral response within the visible band of the electromagnetic spectrum, it is generally preferred that such films be associated with one or more layers of other photoconductive materials having substantial spectral response to visible light. Ordinarily in the fabrication of such imaging members, the oriented film (and other photoconductive layers) is laminated to a supportive, preferably conductive, substrate. Any of the conductive substrates traditionally used in fabrication of electrophotographic imaging members are suitable for use in preparation of such members. The physical geometry of such substrate is not critical to such fabrication and such substrates can be either flexible or rigid. Representative of materials suitable for use in such substrates include aluminum, chromium, brass, stainless steel, their respective alloys, metallized plastic films, metal coated plastic films, and glass plates having semi-conductive oxide coatings. The lamination of the respective elements of such members can involve merely adhesively bonding the various layers of the composite to one another. Adhesives which are suitable for use in this regard are well known in the art (e.g. du Pont 49000 Polyester Adhesive). Alternatively, the various layers of the imaging member can be assembled simply by forming each of the layers (according to a structural sequence) upon a previously fabricated layer. This can be achieved, for example, by vacuum deposition of a photoconductive insulating layer of selenium or an oriented polymeric film of poly(N-vinylcarbazole), followed by vacuum deposition of an aluminum coating on the selenium film. The relative order of such layers within an electrophotographic imaging member will be dictated by the functional relationship of these layers (e.g. photogeneration of charge carriers, transport of charge carriers, or any combination thereof).

After having assembled an electrophotographic imaging member from the oriented polymer films and one or more additional layers according to the above procedure, it can be used in any environment requiring such a photoresponsive element. Because of the enhancement and the mechanical properties of the oriented polymeric film, the resulting member is suitable for use in applications and equipment wherein some flexibility of the member is required; provided, the other laminae of the member are also capable of flexure without damage or separation from the polymeric film and/or the supportive substrate (if any).

Infrared measurements of uniaxially oriented films of poly(N-vinylcarbazole) have shown that all carbazole bands with $B_1$ symmetry exhibit dichroism (D) greater than unity whereas all other absorption bands are less than unity. These $B_1$ vibrational bands correspond to the symmetric out of plane bending modes of the carbazole ring. Thus, it can be concluded that orientation of the polymeric backbone chains of poly(N-vinylcarbazole) tends to align the plane of the pendant carbazyl group perpendicular to the draw direction and thus, out of the plane of the film. If the photogeneration and/or transport of charge carriers in poly(N-vinylcarbazole) take place through the plane of the pendant carbazyl groups (as is currently believed), then conventional orientation procedures can be expected to decrease the photoelectrical response of this polymer. The Examples which follow tend to confirm these observations in addition to providing further illustrations of the processes of this invention. Apparatus and techniques used in preparation and evaluation of the articles prepared by the above processes are standard or as hereinbefore described. Parts and percentages appearing in such Examples are by weight unless otherwise indicated.

EXAMPLE I

A free standing film 50 microns thick is initially prepared by solution casting poly(N-vinylcarbazole) from a 20 weight percent tetrahydrofuran solution. The film is dried for 1 hour in a vacuum at 190° C. The film thus obtained is biaxially oriented on a laboratory film stretcher (available from T.M. Long Company Inc., Neshanic Station, New Jersey) at 221° C. and 500 percent per minute. The film is drawn simultaneously in two directions, perpendicular to each other, until it has attained a size approximately 2½ times its original dimensions. The drawing pressure in both directions is terminated at the same time and the oriented film quenched with a cold metal plate. This procedure produced a balanced biaxially oriented film (approximately 11 microns thick) with a uniform birefringence of 0.016. No infrared dichroism was observed.

Gold electrodes are then evaporated onto one side of the film and this electroded surface grounded to an aluminum plate. This film is then evaluated xerographically by charging to a positive potential of approximately 1870 volts followed by exposure to continuous illumination from a source of activating electromagnetic radiation at 350 nm and $2.3 \times 10^{13}$ photons/cm$^2$/-sec. The rate of photodischarge is approximately 16 volts per micron per second. The above photoresponse, which reflects the photogeneration rate of a balanced oriented film, is approximately one-half that of an unoriented solvent cast film prepared from the same materials.

Selenium is coated on the side of the sample opposite the gold electrode to evaluate the inherent transport properties of the oriented film. At a field of 5 volts per micron, the discharge rate for the balanced oriented film is 0.15 volts per micron per second. This field intensity being roughly proportional to the fourth power of E. This contrasts with a value of 1.0 volts per micron per second and a 1.7 power dependence for transport layers of PVK which have not been oriented.

EXAMPLE II

A film of poly(N-vinylcarbazole) is oriented in the same manner described in Example I except, that elongation along one axis of the sample is continued for approximately 1 second beyond the termination or orientation along the other axis. This staggering of the orientation is substantially equivalent to imposing a disordering strain on a balanced biaxially oriented film. The measured birefringence of the film thus produced (7 microns thick) is 0.025. The discharge rate of the film is determined in the manner described in Example I and found to be 50 volts per micron per second. This compares with 30 volts per micron per second for an unoriented film of PVK and 16 volts per micron per second for the balanced biaxially oriented film prepared in Example I. The corresponding discharge rate and field dependence at 3 volts per micron in the transport mode is 0.4 volts per micron per second and 2 versus 1.0 volts per micron per second and 1.7 for the standard materials and 0.15 volts per micron per second and 4 for the balanced oriented film of Example I.

EXAMPLE III

A film approximately 35 microns in thickness of poly(N-vinylcarbazole) is prepared in the manner described in Example I. This film is uniaxially oriented on the same equipment as described in Example I by drawing in a single direction until the film has approximately doubled in length. At this point, the film is subjected to a secondary strain of 5 percent, in a direction normal to the uniaxial strain but in the same plane as the plane of the film. The oriented film is thereafter quenched in the same manner described in Example I. The resulting film (approximately 7 microns thick) has a birefringence of 0.168 relative to the principal orientation direction. The discharge rate in the photogeneration mode under the conditions stated in Example I is 28 volts per micron per second, essentially the same as that found for the unoriented film.

EXAMPLES IV-VIII

The procedures of Example II are repeated except for the substitution of films of the following polymers for the film of poly(N-vinylcarbazole).

| Example No. | Polymer Film |
|---|---|
| IV | poly(2-vinylcarbazole) |
| V | poly(3-vinylcarbazole) |
| VI | poly(2-vinylanthracene) |
| VII | poly(vinylpyrene) |
| VIII | poly(1-vinylnaphthalene) |

The electrical properties of these films remain substantially the same as a non-oriented film of the same polymer.

EXAMPLE IX

The procedures of Example II is repeated except for the addition of 10 weight percent of 2,4,7-trinitro-9-fluorenone to the tetrahydrofuran solutions of poly(N-vinylcarbazole) prior to casting the polymeric film. The electrical properties of the film remain substantially the same as a non-oriented film of the same polymeric composition.

What is claimed is:

1. A process for enhancing the mechanical properties of films of photoconductive polymers, comprising:

(a) subjecting a film of a polymeric photoconductive material to strain induced orientation whereby the chains of the polymer within said film are oriented along the lines of force imparted by the strain to the film, the extent of orientation of the photoconductive polymer being sufficient to both enhance its mechanical properties and impose spatial constraints on the equilibrium molecular conformation of the bulky photoactive groups pendant from its backbone, said constraints causing deterioration in the charge carrier transport properties of the polymeric film; and (b) subjecting said oriented film to a second strain subsequent to orientation thereof, the extent of stretching of the oriented film during this second strain being insufficient to cause appreciable realignment of the polymer chains of the oriented film in the direction of the second strain yet sufficient to relieve the spatial constraints imposed upon the bulky photoactive groups pendant from the backbone of the polymer, thereby allowing them to return to their equilibrium molecular conformation.

2. The process of claim 1 wherein the extent of orientation of the photoconductive polymeric film is in the range of from about 50 to about 500 percent.

3. The process of claim 1 wherein the polymeric photoconductive film is oriented at a temperature approximately 10 to about 30 centigrade degrees above the softening point of polymeric film.

4. The process of claim 1 wherein the second strain is normal to the plane of orientation of the film.

5. The process of claim 1 wherein the photoconductive polymeric film comprises poly(N-vinylcarbazole).

6. The process of claim 1 wherein the polymeric film comprises poly(2-vinylcarbazole).

7. The process of claim 1 wherein the polymeric photoconductive film comprises poly(3-vinylcarbazole).

8. The process of claim 1 wherein the polymeric film comprises poly(2-vinylanthracene).

9. The process of claim 1 wherein the polymeric photoconductive film comprises poly(vinylpyrene).

10. The process of claim 1 wherein the polymeric photoconductive film comprises poly(1-vinylnaphthalene).

11. A process for enhancing the mechanical properties of films of photoconductive polymers, comprising:

subjecting a film of polymeric photoconductive materials to strain induced orientation by applying a continuous strain along at least one of its principal axis concurrent with applying a staggered strain normal to the direction of the continuous strain whereby the chains of polymer within said film are oriented along the lines of force imparted by the continuous strain, the film thereby being oriented in the direction of the continuous strain to an extent sufficient to both enhance its mechanical properties and impose spatial constraints on photoactive groups pendant from the backbone of the polymer, the extent of stretching of the film in the direction of the staggered strain being insufficient to cause appreciable realignment of the oriented film in the direction of the staggered strain yet sufficient to relieve the spatial constraints imposed upon the bulky photoactive groups, thereby allowing them to return to their equilibrium molecular conformation.

12. The process of claim 11 wherein the extent of orientation of the photoconductive polymeric film by the continuous strain is in the range of from about 50 to about 500 percent.

13. The process of claim 11 wherein the polymeric photoconductive film is oriented at a temperature approximately 10 to about 30 centigrade degrees above the softening point of polymeric film.

14. The process of claim 11 wherein the photoconductive polymeric film comprises poly(N-vinylcarbazole).

15. The process of claim 11 wherein the polymeric film comprises poly(2-vinylcarbazole).

16. The process of claim 11 wherein the polymeric photoconductive film comprises poly(3-vinylcarbazole).

17. The process of claim 11 wherein the polymeric film comprises poly(2-vinylanthracene).

18. The process of claim 11 wherein the polymeric photoconductive film comprises poly(vinylpyrene).

19. The process of claim 11 wherein the polymeric photoconductive film comprises poly(1-vinylnaphthalene).

20. The process of claim 11 wherein the polymer film is uniaxially oriented.

21. The process of claim 11 wherein the polymer film is biaxially oriented.

22. The process of claim 1 wherein the polymer film is uniaxially oriented in step (a).

23. The process of claim 1 wherein the polymer film is biaxially oriented to step (a).

* * * * *